(12) United States Patent
Yatsenko

(10) Patent No.: US 7,475,656 B2
(45) Date of Patent: Jan. 13, 2009

(54) HYDROGEN AND OXYGEN PRODUCTION AND ACCUMULATING APPARATUS INCLUDING AN INTERNAL COMBUSTION ENGINE AND METHOD

(76) Inventor: Yuriy Yatsenko, 7639 Loretto Ave., Philadelphia, PA (US) 19111

( * ) Notice: Subject to any disclaimer, the term of this patent is extended or adjusted under 35 U.S.C. 154(b) by 183 days.

(21) Appl. No.: 11/374,779

(22) Filed: Mar. 14, 2006

(65) Prior Publication Data
US 2007/0215070 A1 Sep. 20, 2007

(51) Int. Cl.
*F02M 25/00* (2006.01)
*F02M 25/10* (2006.01)
(52) U.S. Cl. ................................. 123/1 A; 123/DIG. 12
(58) Field of Classification Search ............... 123/3, 123/DIG. 12, 1 A
See application file for complete search history.

(56) References Cited

U.S. PATENT DOCUMENTS

| | | | | |
|---|---|---|---|---|
| 3,939,806 A | * | 2/1976 | Bradley | 123/3 |
| 4,112,875 A | * | 9/1978 | Fletcher et al. | 123/3 |
| 4,140,909 A | * | 2/1979 | Brown et al. | 250/370.14 |
| 4,344,831 A | * | 8/1982 | Weber | 204/228.5 |
| 4,625,681 A | * | 12/1986 | Sutekiyo | 123/3 |
| 5,119,768 A | * | 6/1992 | Russell | 123/1 A |
| 5,243,025 A | * | 9/1993 | Farnham et al. | 528/392 |
| 6,257,175 B1 | * | 7/2001 | Mosher et al. | 123/3 |
| 6,314,918 B1 | * | 11/2001 | McFarland et al. | 123/3 |
| 6,502,550 B1 | * | 1/2003 | Kotwicki et al. | 123/406.47 |
| 6,770,186 B2 | * | 8/2004 | Rosenfeld et al. | 205/343 |
| 6,981,367 B2 | * | 1/2006 | Childs et al. | 60/275 |
| 2002/0117124 A1 | * | 8/2002 | McMaster et al. | 123/3 |
| 2002/0117125 A1 | * | 8/2002 | McMaster et al. | 123/3 |
| 2002/0179454 A1 | * | 12/2002 | Ross | 205/637 |

OTHER PUBLICATIONS

Poirier, Jean. "Production of hydrogen." Lavoisier's Friends. Jun. 25, 2007. <http://historyofscience.free.fr/Lavoisier-Friends/a_tab6_hydrogen_production.html>.*
"Department of Energy Selects SRI International to Develop Prototype System for Low-Cost Generation of Hydrogen." Aug. 31, 2005. SRI International. Jun. 25, 2007. < http://www.sri.com/news/releases/08-30-05.html>.*

(Continued)

*Primary Examiner*—Michael Cuff
*Assistant Examiner*—Ka Chun Leung
(74) *Attorney, Agent, or Firm*—Aleksandr Smushkovich

(57) ABSTRACT

An apparatus, including an internal combustion engine, produces hydrogen fuel from water to power the engine, comprises water supply means, fuel storage means, controlling means, a collector receiving combustion products output from engine's operation, a transformer utilizing thermo-impact of the combustion products and decomposing supplied water into hydrogen and oxygen, an ion divider electrically separating hydrogen and oxygen ions into gaseous hydrogen, further directed into the fuel storage means and controllably fed substantially into engine's cylinders, and gaseous oxygen. It also includes exhaust means outputting exhaust products from the collector into the atmosphere, on their way out heating water in the water supply means. The fuel storage means contain initial hydrogen or another predetermined fuel. Electrolyzer means are provided to supplement hydrogen and oxygen ions production. Recommended temperature and parts size ranges for six-and eight-cylinder engines are disclosed. A truck engine usable embodiment is also illustrated and described.

12 Claims, 3 Drawing Sheets

OTHER PUBLICATIONS

Mawdsley et al. "High-Temperature Steam Electrolysis for Hydrogen Production." Dec. 6, 2005. Argonne National Laboratory. Jun. 25, 2007. <www.cmt.anl.gov/.../Poster_Tour/Posters/Fuel_Cells/High_Temperature_Steam_Electrolysis-Mawdsley.pdf>.*

"Milestone for H2 Production by High-Temperature Electrolysis." Nov. 29, 2004. Green Car Congress. Jun. 25, 2007. <http://www.greencarcongress.com/2004/11/milestone_for_h.html>.*

* cited by examiner

HYDROGEN AND OXYGEN PRODUCTION AND ACCUMULATING APPARATUS INCLUDING AN INTERNAL COMBUSTION ENGINE AND METHOD

TECHNICAL FIELD

The present invention relates to hydrogen and oxygen production devices, more specifically to devices and methods of producing hydrogen and oxygen from water for use in internal combustion engines.

BACKGROUND OF THE INVENTION

Since Henry Cavendish's discovery of "flammable air" in 1766 (named "hydrogen" by Antoine Lavoisier in 1783), hydrogen is widely used in chemical synthesis, in hydrocracking of natural hydrocarbons, in food industry, in welding, as a rocket fuel, etc. There have been a lot of efforts to develop new technologies based on the use of hydrogen in automobile and other engines, since it might provide a powerful and clean source of energy. It would improve the environment by reducing air pollution necessarily produced by burning hydrocarbon fuels, reduce people's oil dependency by limiting the consumption of oil-based products for energy generating, save natural oil, whose supply in the earth is gradually depleting, for other productive purposes, and also would drive down gasoline prices and other consumer prices dependent on the oil price.

One of the most popular such technologies is fuel cells. They utilize hydrogen for producing electrical energy (chemical reactions involve hydrogen and oxygen may produce electricity and water), which can then power electrical engines for transportation or other purposes. At present the use of fuel cells is limited by their heavy weight, necessity of additional complicated equipment, and economical reasons based on high cost of commercial hydrogen production.

Some world renown car makers (such as BMW, Mazda, etc.) propose hybrid solutions combining traditional fuels (e.g. gasoline) of internal combustion engines with hydrogen. These technologies require means for production, storage, and utilization of hydrogen in the engines. Many U.S. patents describe different devices and methods dedicated to the hydrogen and hybrid technologies.

For example, U.S. Pat. No. 4,625,681 teaches that gaseous water (probably meaning vapor) may be generated from liquid state water by a gasifier, and then the gaseous water is dissociated by multi-step electrical discharge and induction heating to generate electro-conductive plasma. The method is complicated and costly, and so far is not noticeably usable in practice.

U.S. Pat. No. 4,140,090 teaches that hydrogen may be utilized as a supplemental gaseous fuel for a precombustion chamber. "An electrolytic generator can be incorporated with the precombustion chamber mechanism for generating hydrogen and oxygen gases to operate the precombustion chamber. The electrolytic generator includes an automatic water feed system for replacing the water used to generate the hydrogen and oxygen gases and incorporates an electrode and internal pressurization arrangement for automatically shutting off the generation of hydrogen and oxygen gases on engine shut-down and for storing a sufficient quantity of hydrogen and oxygen gases to facilitate subsequent engine start-up". The use of an electrolytic generator (electrolyzer) for continues generation of hydrogen from water usually requires significant electrical power consumption that prevents its broad usage.

Another U.S. Pat. No. 4,344,831 particularly teaches an apparatus for generation of hydrogen, including an electrolytic tank for circulating and cooling the electrolyte solution therein. It utilizes an electrolyzer to produce hydrogen and oxygen in separate compartments and further mixes them prior to entering an internal combustion engine, and thus needs plenty of electrical power for the process.

U.S. Pat. No. 5,243,025 teaches a water-to-fuel production apparatus including a tank divided into compartments: a first (cathode) compartment is for producing hydrogen, and a second (anode) compartment is for producing oxygen. The gases don't contact each other until mixed prior to entering an internal combustion engine, wherein free hydrogen is injected into the combustion chamber to stimulate combustion of more inert or slower-burning fuels. A third compartment intakes water contained in the engine's exhaust. The gaseous hydrogen and oxygen are produced by elevated temperature electrolysis of the water. The apparatus' exhaust gases, usually having a temperature about 177.degree.C. or 350.degree.F., are used for purposes of heating the electrolyzer. The use of waste heat in endothermic electrolysis improves efficiency of the overall process, but still requires substantial electrical power supply.

Another U.S. Pat. No. 6,981,367 teaches a device for generating hydrogen from an exhaust containing water vapor. The device comprises an exhaust diverter and a hydrogen generation section, including an electrolysis unit, in one of the embodiments accumulating and storing hydrogen generated by the electrolysis unit directly from the exhaust water vapor. In an embodiment the electrolysis unit is thermally coupled to an exhaust duct, providing a means by which the waste heat of the electrolysis unit can be absorbed in the exhaust gas, i.e. cooling the electrolysis unit. Therefore a portion of the electrical power used in the electrolysis process is utilized for the condensing of water from the exhaust water vapor. Understandably, this would require more electric energy.

One more U.S. Pat. No. 6,314,918 teaches a renewable hydrogen gas generating system comprising a series of components integrally connected to an internal combustion engine, voltage supplied by an alternator and specifically designed high output electrical power generating device to energize a multiple cell anode and cathode electrolyzer for liberating hydrogen at greater than 100% efficiency levels. As stated in the patent's disclosure: "The practical application of the electrolysis method has previously resulted in many less than satisfactory attempts, primarily due to insufficient hydrogen gas production. Because of the electrical power levels required to liberate the hydrogen gas, this method can only be efficient if an onboard power supply is capable of furnishing ample current for adequate gas production".

It further states: "The Electrolyzer Unit 12 is supplied electrical current through a High Output Electrical Generating Device 60. This is accomplished when the rotations of the engine turn a Pulley 80 which spin the belt-driven OEM Alternator 48 and the belt-driven High Output Electrical Generating Device 60. As they spin, current is discharged from the power windings of the OEM Alternator 48, through a Bridge Rectifier 56, Capacitors 58, and then connecting to the power windings of the High Output Electrical Generating Device 60, through a Bridge Rectifier 64, Capacitors 66, passing through a Pressure Switch 40, and finally to the Anode Connection 14 and the Cathode Connection 16 of the Electrolyzer Unit 12. In the event of low fuel pressure upon starting the engine, an AC Power Cord 74 with an On/Off Controller 76 is included to plug into regular 110-120 V AC household current (or 220-240 VAC, where applicable) to pre-pressurize the fuel system". Therefore, the above described system seems to typically require a start-up charging from an outside voltage source, which raises a question if it can be shut down and readily restarted, for instance in a parking space without an electrical power outlet. The second issue is a structure of the "specifically designed high output electrical power generating device", which is not disclosed in detail in that patent's specification.

U.S. Pat. No. 6,770,186 discloses a hydrogen-fueled motor vehicle including at least one hydrogen-fueled locomotion subsystem and at least one refuelable hydrogen generator operative to supply hydrogen fuel to the hydrogen-fueled locomotion subsystem on demand. The refuelable hydrogen generator includes at least one electrochemical reactor operative to generate the hydrogen fuel from water on demand and a refueling subsystem providing at least one of water, electrolyte, hydrogen, a metal containing material and electrical power to the electrochemical reactor. That invention particularly concerns with the refueling of the system.

A U.S. patent application publication 20020179454 A1 describes an electrolysis cell using "electrodes constructed of expanded nickel to generate gas, and includes a region designated as an electrolytic fog. A fan and condenser help lower the temperature of the gas and reduce moisture. The electrolysis is further enhanced by regulating the power input to the cell. In this way the device of the present invention produces an adequate supply of gas to aid combustion. The device delivers the gas to the engine under pressure, thereby ensuring a constant flow even when the air intake pressure is high due to turbocharger boost. The gases are continuously available, aided by a separate on-board water supply that automatically replenishes the cell when needed. The device contains both heating and cooling features that enable gas to be generated in extreme weather conditions. The only operator maintenance required is to occasionally refill the water supply."

The descriptions and drawings of the above enumerated U.S. patents are available from the official website of the U.S. Patent and Trademark Office presently named "http://patft.uspto.gov/netahtml/srchnum.htm" by inserting their numbers in the search box and getting search results, whereas the descriptions and drawings for the patent application publication may be found on another U.S. PTO official website, at the present time named: "http://appft1.uspto.gov/netahtml/PTO/srchnum.html".

Therefore the technologies of hydrogen producing and utilization of hydrogen-containing fuels in engines remain to be promising, and, on the other hand, need new solutions to become technically viable and commercially practical.

BRIEF SUMMARY OF THE INVENTION

While the structural arrangements of the above described and many other devices, at first appearance, have similarities with the present invention, they differ in material respects that will become apparent from the following discussion. These differences are essential for the use of the present invention.

It is therefore aims of the invention to provide a novel and useful apparatus and method for producing hydrogen. The apparatus should incorporate an internal combustion engine to improve operation of the latter, to avoid or at least essentially limit the use of hydrocarbon-based fuels, and to substantially eliminate exhaust of pollutants into the atmosphere. Other aims of the invention might become apparent to a skilled artisan from a consideration of the drawings, ensuing description, and claims as hereinafter related.

The inventive apparatus, including an internal combustion engine, produces hydrogen fuel from water to power the engine. It comprises at least water supply means; fuel storage means; controlling means; a collector receiving combustion products output from the engine's operation; a transformer utilizing an effect of decomposing water under predeterminedly high temperature (discovered by Lavoisier, which is herein further called a thermo-impact) of the combustion products and converting a water body, supplied from a water cooling means of the engine, into a mixture of ionized hydrogen and oxygen; an ion divider, electrically separating hydrogen and oxygen ions into gaseous hydrogen, further directed into the fuel storage means and controllably fed substantially into engine's cylinders, and gaseous oxygen; an exhaust means thermally coupled to the water supply means, for outputting of exhaust products from the collector into the atmosphere and heating the supplied water.

An initial fuel supply (liquid hydrogen or hydrocarbon fuel of certain types) is placed in the fuel storage means. An electrolyzer means may be provided to supplement hydrogen and oxygen ions production, and may be mounted within the ion divider. Temperature and parts size ranges for six- and eight-cylinder engines are provided in the disclosure. An oxygen exhaust means arrangement for a truck engine is also described in an additional embodiment.

BRIEF DESCRIPTION OF THE DRAWINGS

The same reference numerals are in general referred to the same or similar units or parts on different drawings.

DESCRIPTION OF THE PREFERRED EMBODIMENT OF THE PRESENT INVENTION

Figure 1:
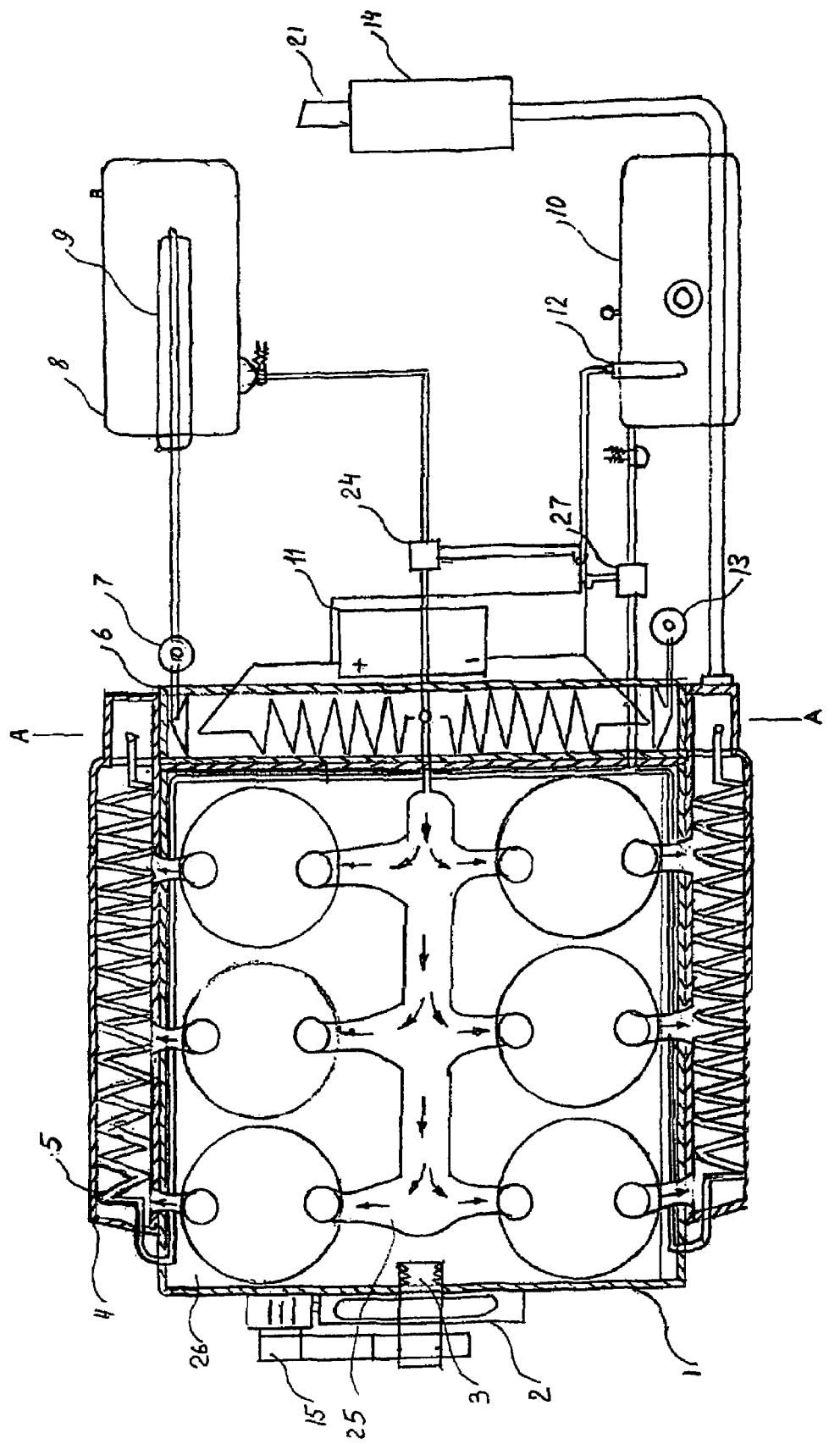
FIG. 1 illustrates a plan sectional view of the apparatus' units coupled to an internal combustion engine, according to a preferred embodiment of the present invention.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

Referring to the drawing on FIG. 1, there is shown an apparatus comprising a generally conventional internal combustion engine (1) with exemplarily six cylinders. Other embodiments may include a different number of cylinders, or a different schema or relative positions of their arrangement. The cylinders of engine 1 are disposed within a cooling jacket (26) fillable with water. The apparatus comprises an intake chamber (25), generally positioned above engine 1, between the cylinders' heads, as shown on FIG. 1. Each of the cylinders has an inlet opening in its upper head portion, and all the inlet openings are communicated with intake chamber 25. Generally, chamber 25 receives fuel and distributes it to the heads of the cylinders.

According to the present invention, an apparatus, illustrated on FIG. 1, comprises an electrical generator (15) capable to be rotated by a shaft (not shown) of engine 1; a water pump (2) driven by generator 15; a thermostat (3), being a part of a controlling system (entirely not illustrated herein) of engine 1, thermally controlling the input of water from jacket 26 into pump 2; a collector (4) having preferably two substantially parallel tubular portions (which are better seen on FIG. 1) disposed along the outer sidewalls of engine 1, and a V-like shaped tube portion (better seen on FIG. 2); a transformer (5) receiving water from pump 2, which transformer 5 is shaped as a spiral pipe disposed within the tubular portions of collector 4, and further extended as a V-like shaped pipe within the V-shaped tube portion of collector 4, which transformer 5 is thermally coupled to collector 4, and used to substantially transform water eventually into ions of hydrogen and oxygen; a purge valve (22) mounted below the bottom region of the V-like shaped tube portion of collector 4, wherein valve 22 is communicated with transformer 5 and used to lower the pressure in transformer 5, if it's surged above a predetermined level, protecting the apparatus from destruction.

It is presently believed that collector 4 should preferably have a diameter in the range of from 35 mm to 65 mm (or approximately from 1.5 inches to 2.5 inches). The inner diameter of transformer 5 should preferably be 6 mm, and the outer diameter of transformer 5 should preferably be 8 mm (for a six-cylinder engine) and 10 mm (for an eight-cylinder engine).

Figure 2:
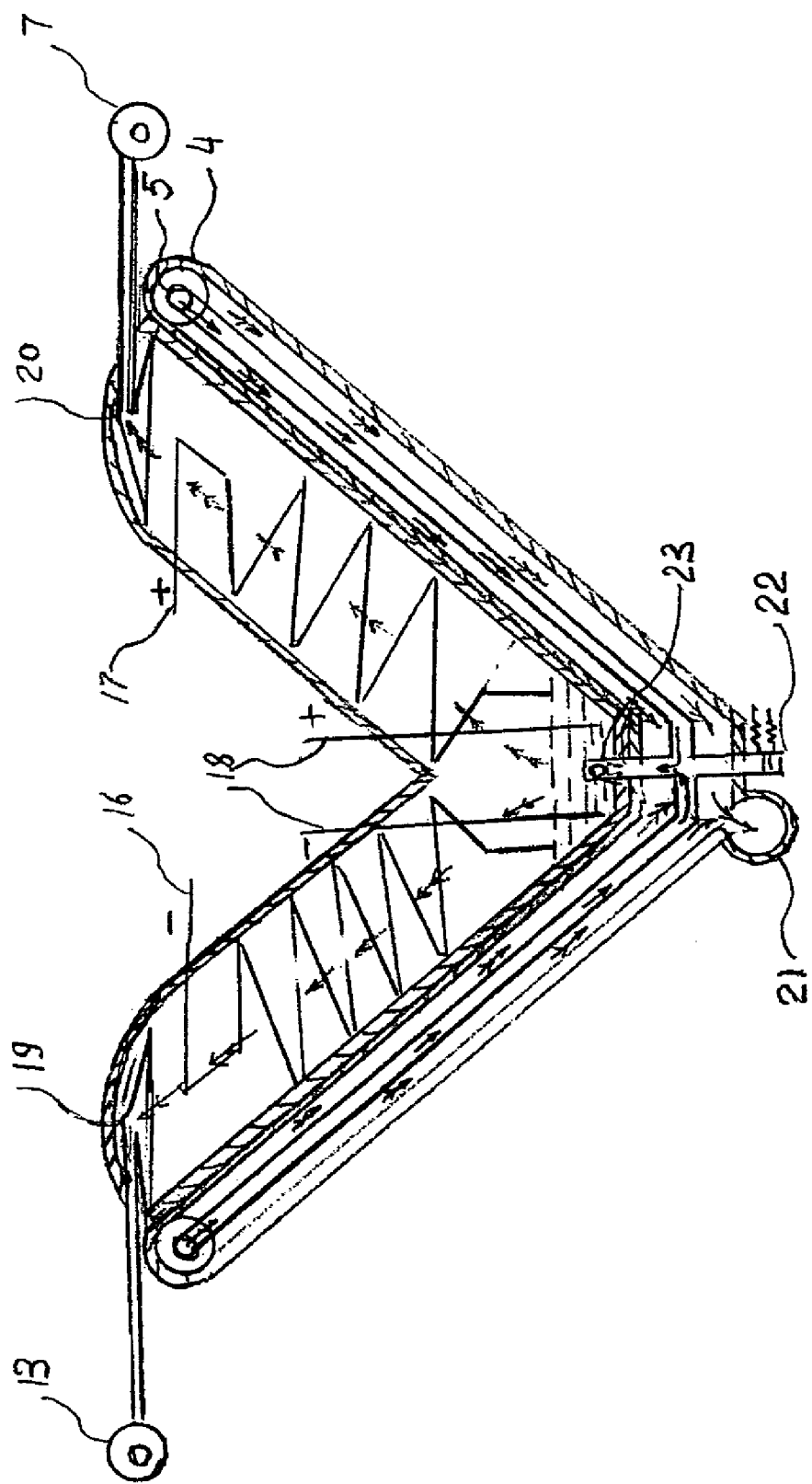
FIG. 2 illustrates a side sectional view of the apparatus' ionization unit, according to the present invention.

The inventive apparatus further comprises an ion divider (6) essentially shaped as a V-like tubular chamber, illustrated on FIG. 2. Divider 6 has a knee-like junction in its bottom region joining its two tubular portions: a left and a right portion. Divider 6 is mounted immediately above the V-shaped portion of collector 4 and is communicated with it through a one-way valve (23). The left tubular divider portion within its top region has, for example, a hydrogen outlet (19), and the right tubular divider portion within its top region respectively has an oxygen outlet (20).

The inventive apparatus comprises a direct current source (11) depicted on FIG. 1, which may be a conventional automobile battery; and two electro-conductive coils (16) and (17). The left portion of divider 6 contains coil 16 disposed along the inner sidewall of the left divider portion, with a lower end of coil 16 positioned in the left bottom region of divider 6, and a top end of coil 16 positioned in the top region of the left portion of divider 6. Similarly, the right portion of divider 6 contains coil 17 disposed along the inner sidewall of the right divider portion, with a lower end of coil 17 positioned in the right bottom region of divider 6, and a top end of coil 17 positioned in the top region of the right portion of divider 6. The top end of coil 16 is electrically connected to the minus-pole of DC source 11, and the top end of coil 17 is electrically connected to the plus-pole of DC source 11, as depicted on FIG. 2. In case of the opposite electrical connection, hydrogen outlet 19 and oxygen outlet 20 would be correspondingly replaced.

The inventive apparatus comprises a pair of electrodes (18), reflected on FIG. 2, disposed in the bottom region of divider 6 and electrically connected to DC source 11. The left electrode 18 (cathode) is connected to the minus-pole, and the right electrode 18 (anode) is connected to the plus-pole of DC source 11. Electrodes 18 can provide for an electrolytic dissociation of condensed water in divider 6.

As illustrated on FIG. 1, the inventive apparatus comprises a hydrogen vacuum pump (7), connected through a pipe to hydrogen outlet 20 of divider 6; a hydrogen tank (8) connected by a pipe to hydrogen pump 7; a liquid nitrogen cooler (9), the most portion of which cooler is disposed inside hydrogen tank 8, so that cooler 9 embraces a substantial portion of the pipe connecting hydrogen tank 8 with hydrogen pump 7 as shown on FIG. 1; an injection control unit (24), being a part of the apparatus' controlling system, having an inlet opening connected by a pipe to hydrogen tank 8 and an outlet opening connected by a pipe to intake chamber 25; an oxygen pump (13) for output of oxygen, produced by the apparatus. In this embodiment the produced oxygen is output into the atmosphere.

The inventive apparatus comprises a water tank (10), shown on FIG. 1. Water tank 10 supplies water to cooling jacket 26. Water tank 10 is connected to a water supply control unit (27), illustrated on FIG. 1, being a part of the apparatus' controlling system. Water control supply unit 27 is connected to cooling jacket 26 by a pipe. Water tank 10 contains an electric heater (12), controllably connected to DC source 11, to provide an initial heating of water in tank 10 to a predetermined temperature.

The inventive apparatus comprises an exhaust duct (21), illustrated on FIG. 1, connected by a first end to collector 4. A portion of exhaust duct 21 is extended through and enclosed in water tank 10. Another portion of exhaust duct 21 is extended through and enclosed in a muffler (14). A second end of exhaust duct 21 is protruded from muffler 14, and which second end is open to the atmosphere.

The apparatus' controlling system senses the temperature of water in tank 10. When the temperature is less than 80.degree.C., the controlling system switches electric heater 12 on. When the exhaust products flow through the portion of exhaust duct 21, extended through and enclosed by water tank 10, it heats up the water contained in water tank 10, the water temperature rises above 80.degree.C., and the controlling system switches electric heater 12 off.

The apparatus' controlling system is generally configured to maintain a predetermined temperature of water in cooling jacket 26 by inletting water from water tank 10 through water supply control unit 27, and letting out the water from cooling jacket 26 (the cooling jacket outlet is not shown herein).

The apparatus' controlling system is configured to regulate (through control unit 24) the hydrogen flow particularly based on movements of a driver's pedal, and to maintain a substantially constant pressure level of the hydrogen gas entering intake chamber 25.

OPERATION OF THE PREFERRED EMBODIMENT OF PRESENT INVENTION

For the very first launch of the apparatus, a predetermined amount (preferably from one to two gallons) of liquid hydrogen or another liquid hydrocarbon fuel (such as methane, propane, butane, etc.) should be poured into hydrogen tank 8. Nitrogen cooler 9 should contain a predetermined amount of liquid nitrogen, and water tank 10 should contain a predetermined amount of water.

Heater 12 is switched on and fed from DC source 11 until the temperature of water in water tank 10 reaches about 80.degree.C. (it may take about 10 minutes), at which temperature thermostat 3 opens the water flow into water pump 2 that pumps water into transformer 5. Injection control unit 24 opens, and the liquid hydrogen (or another initial fuel used for the first launch) flows from tank 8 to intake chamber 25, and further into the cylinders of engine 1. Spark plugs (not shown) are operated by a conventional ignition system (not shown) of engine 1, initiating combustion in the cylinders, producing heat (further transformed into mechanical torque) and exhaust products (generally water plus other combustion reaction products if a hydrocarbon fuel is used for the first launch).

During the combustion process, within about 5 minutes, the exhaust products reach a temperature substantially in the range from 800.degree.C. to 1000.degree.C., and are expanded into collector 4. The molecules of water contained in transformer 5 are subjected to a thermo-impact or thermo-impulse and momentarily dissociate eventually into positively charged hydrogen ions and negatively charged oxygen ions.

Lavoisier observed such process in his experiments with pouring water into an incandesced iron barrel (made white-hot), and he was able to register hydrogen and oxygen as output products of the reaction. Relevant information is placed on:

http://web.lemoyne.edu/~giunta/EA/
LAVEAUann.HTML#foot11: 'Elements and Atoms: Chapter 6 Water is not an element: Lavoisier . . . [14]Lavoisier described elsewhere another experiment in which water was decomposed by contact with iron. View a diagram of the apparatus at Les Amis de Lavoisier. Here water vapor was placed in contact with a hot iron gun barrel.' The apparatus diagram is illustrated on: http://historyofscience.free.fr/Lavoisier-Friends/a_tab6_hydrogen_production.html.

Through valve 23, a mixture of highly energized ions enters divider 6, and the mixture divides into a hydrogen ions stream attracted by coil 16 and an oxygen ions steam attracted by coil 17. The temperature inside divider 6 may be estimated in the range from 200.degree.C. to 400.degree.C. As a result, hydrogen atoms are collected at hydrogen outlet 19, and oxygen atoms are collected at oxygen outlet 20. Oxygen pump 13 outputs the collected oxygen gas into the atmosphere. Hydrogen pump 7 pumps the collected hydrogen gas (with a temperature about from 50.degree.C. to 100.degree.C.) into hydrogen tank 8, wherein it is cooled by nitrogen cooler 9 and compressed. The compressed hydrogen gas flows through injection control unit 24 into intake chamber 25, and enters the cylinders continuing the combustion process.

When the apparatus is utilized to power a motor vehicle, the driver is capable to govern the vehicle's movement by pressing a gas pedal, which causes control unit 24 to increase the hydrogen flow accordingly, thereby accelerating the vehicle. A brake pedal may also be used to reduce or stop the hydrogen flow into intake chamber 25.

The exhaust products, produced by combustion in the cylinders enter collector 4, heat up the water flowing in transformer 5, and enter exhaust duct 21. Passing the exhaust duct's portion extended through and enclosed by water tank 10, the exhaust products heat up the water contained in water tank 10

An additional process takes place in divider 6. When engine 1 is shut down, the remaining mix of hydrogen and oxygen ions in divider 6 may reversibly associate into molecules of water vapor, and then, being condensed, may be collected in the form of a liquid water body in the bottom region of divider 6. The condensed water body can be used for generation of hydrogen for the subsequent engine start. With this purpose, electrodes 18, electrically connected to DC source 11, may be used in an electrolysis process producing hydrogen at the cathode, and oxygen at the anode. Since the cathode and anode are respectively disposed in the left and right tubular portions of divider 6, the hydrogen gas is collected by hydrogen outlet 19, and the oxygen gas is collected by oxygen outlet 20. Therefore, the hydrogen, produced at the engine's starting stage during the electrolysis process in divider 6, and is generally used to fill hydrogen tank 8 to supplement launching the engine's combustion at a subsequent engine start.

BRIEF DESCRIPTION OF AN ADDITIONAL EMBODIMENT OF THE PRESENT INVENTION

Figure 3:
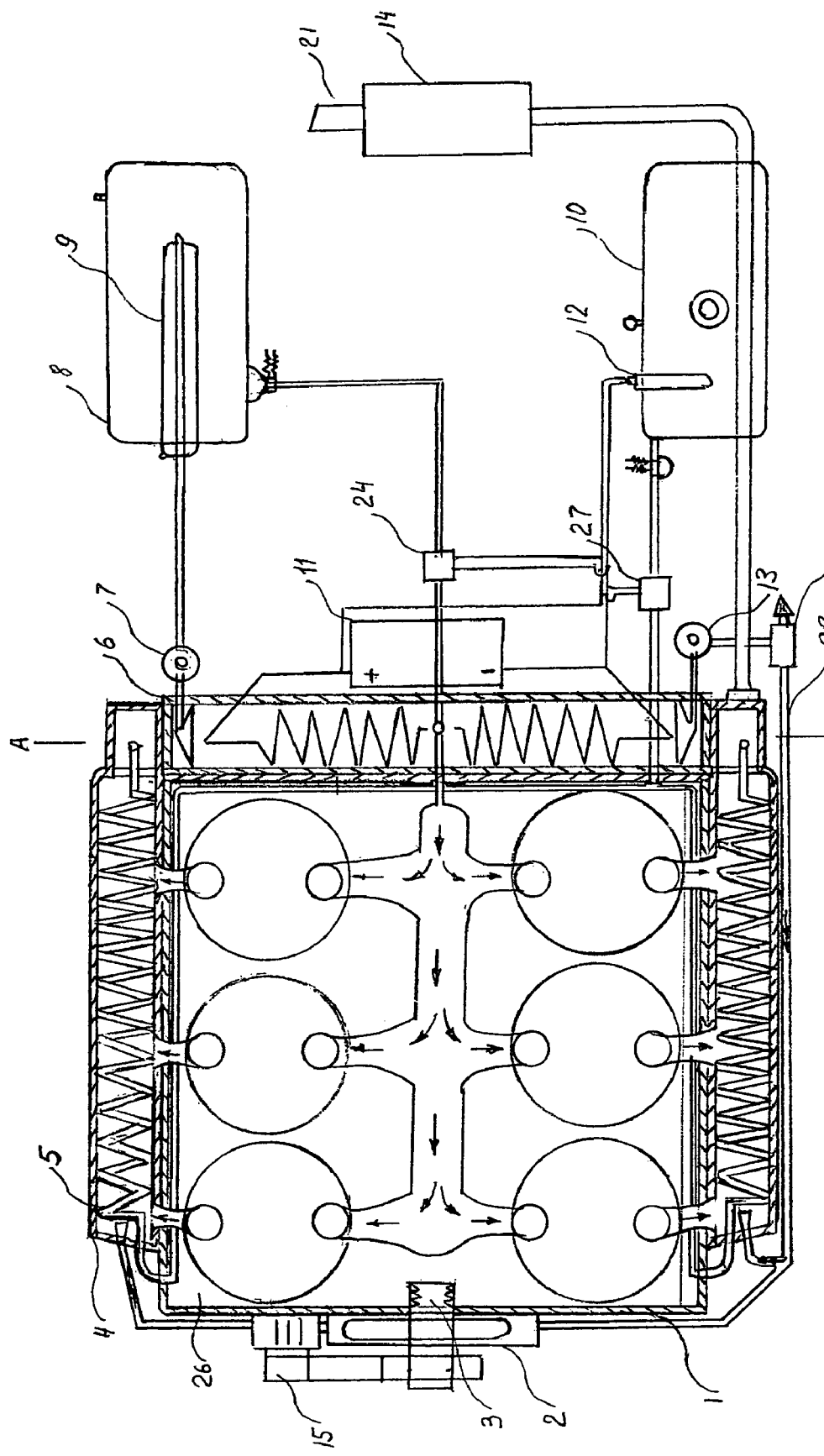
FIG. 3 illustrates a partial plan sectional view of the apparatus' units coupled to an internal combustion engine, according to another embodiment of the present invention.

Another embodiment of the present invention, illustrated on FIG. 3, differs from the preferred embodiment, disclosed above, in that oxygen pump 13 is connected with an electronic oxygen control device (29), further communicated with an oxygen duct (28) to the tubular portions of collector 4. The oxygen flow is shown on FIG. 3 by double-arrows inside oxygen duct 28. This allows utilizing the oxygen produced by the apparatus for its reaction with the exhaust products output from the cylinders, and to increase the temperature inside collector 4.

Control device 29 is configured to sense the temperature inside transformer 5 and to maintain it about 800.degree.C. When the temperature rises above, control device 29 is triggered, and starts outputting the oxygen gas into the atmosphere. The modified embodiment may be usable, for example, in truck engines, which need more power, and thus require intensifying the production of hydrogen.

The inventive apparatus requires to timely refill the water tank, which would be the major measure necessary to maintain the apparatus' operation. The use of hydrogen fuel should increase the engine's horsepower, eliminate pollution exhaust, save oil for productive utilizations others than energy generating, and provide a cleaner environment.

I claim:
1. An apparatus for obtaining mechanical power or torque comprising
   an internal combustion engine, having a predetermined number of cylinders and a water cooling means;
   a producing means for production of hydrogen for powering said internal combustion engine and for production of oxygen from water;
   a hydrogen storage means for storage of said produced hydrogen;
   a water storage means for storage of said water;
   an exhaust outlet means for at least partial output of combustion products formed during operation of said internal combustion engine;
   a control means for actuation, de-actuation, and automatic control of predetermined parameters of at least said water, hydrogen, and oxygen;
   an electrical energy source for operation of at least said internal combustion engine, said producing means, and said controlling means;
   said producing means being so configured that at least partially provide decomposition of the water into hydrogen and oxygen ions by subjecting it to predeterminedly high temperatures developed due to and during a combustion process within said internal combustion engine, said producing means comprising:
   a collector, communicating with said cylinders, and configured to collect said combustion products;
   a transformer configured to intake water substantially from the water storage means, decompose the water into hydrogen ions and oxygen ions, said transformer substantially enclosed in said collector, the water in the transformer being subjected to thermo-impact caused by said combustion products surrounding the transformer in the collector and having a temperature in a predetermined temperature range;

an ion divider, configured to separate positively charged said hydrogen ions and negatively charged said oxygen ions, said divider including two tubular portions joined in the bottom region of the divider, each portion containing an electrical conductive coil, wherein the top end of a first coil connected to a positive pole of said energy source, and the top end of a second coil connected to a negative pole of said energy source, the bottom ends of both coils disposed in the bottom region of the divider, the tubular portion containing the second coil, substantially communicated with the hydrogen storage means;

a hydrogen pump configured to pump the hydrogen produced in said divider into the hydrogen storage means, wherein the hydrogen is substantially in a gaseous state under a predetermined pressure; and an oxygen pump configured to pump the oxygen produced in said divider out of the divider.

2. The apparatus according to claim 1, wherein
said collector comprising two tubular portions mounted along sidewalls of the internal combustion engine, and one V-shaped tube portion mounted below the ion divider; said tubular portions having a diameter being within a range from 35 mm to 65 mm, or from 1.5 inches to 2.5 inches.

3. The apparatus according to claim 2, wherein
said transformer configured partially as two spirally-shaped pipes each placed within each of said two tubular portions, and partially as a V-shaped pipe connected to the spirally-shaped pipes, the V-shaped pipe placed within said V-shaped tube portion of the collector;
said transformer substantially having an inner diameter of 6 mm and an outer diameter of 8 mm; and
said transformer preferably used in said apparatus, wherein the predetermined number of said cylinders being six.

4. The apparatus according to claim 2, wherein
said transformer configured partially as two spirally-shaped pipes each placed within each of said two tubular portions, and partially as a V-shaped pipe connected to the spirally-shaped pipes, the V-shaped pipe placed within said V-shaped tube portion of the collector;
said transformer substantially having an inner diameter of 6 mm and an outer diameter of 10 mm; and
said transformer preferably used in said apparatus, wherein the predetermined number of said cylinders being eight.

5. The apparatus according to claim 1, wherein
said water storage means comprising a water tank, capable to contain a water body, said water tank substantially enclosing an electrical heater, connected to said energy source, to heat up the water body in the water tank, which water body supplied to said internal combustion engine.

6. The apparatus according to claim 5, wherein
the water in said water tank is allowed to pass into said transformer when the water is at a temperature of at least 80.degree.C.

7. The apparatus according to claim 5, wherein
said exhaust means comprising an exhaust duct, an end of which duet connected to the collector,
a portion of the exhaust duct extending through and enclosed in said water tank, providing for said combustion products to heat up said water contained therein, thereby substantially maintaining a predetermined temperature of the water in the water tank.

8. The apparatus according to claim 7, wherein
said predetermined temperature of the water substantially being at least 80.degree.C.

9. The apparatus according to claim 1, wherein
said predetermined temperature range is limited from 800.degree.C. to 1000.degree.C.

10. The apparatus according to claim 1, further comprising
a pair of electrodes consisting of an anode, connected to the positive pole of said energy source, and a cathode, connected to a negative pole of said energy source;
said electrodes disposed in the bottom region of said divider to provide electrolysis of a liquid water body, when the water body present in the divider.

11. The apparatus according to claim 1, wherein
the portion of said divider, containing the first coil, substantially communicated with the tubular portions of said collector to supply oxygen for intensification of heating the transformer and water contained therein.

12. The apparatus according to claim 1, wherein
said hydrogen storage means comprising a tank, capable to contain compressed hydrogen, or liquid hydrocarbon gas, or liquid hydrogen, and substantially enclosing a cooler containing liquid nitrogen.

* * * * *